US007418159B1

(12) United States Patent
Bakker et al.

(10) Patent No.: US 7,418,159 B1
(45) Date of Patent: Aug. 26, 2008

(54) DOCUMENT PROCESSING SYSTEM WITH TRACK ALLOWING SELECTIVE REPROCESSING OF DOCUMENTS

(75) Inventors: Johan P. Bakker, Livingston, MI (US); Joe M. Gagnier, Birmingham, MI (US); Paul J. McCarthy, Commerce, MI (US); J. Michael Spall, Commerce, MI (US)

(73) Assignee: Unisys Corporation, Blue Bell, PA (US)

( * ) Notice: Subject to any disclaimer, the term of this patent is extended or adjusted under 35 U.S.C. 154(b) by 493 days.

(21) Appl. No.: 11/153,836

(22) Filed: Jun. 15, 2005

(51) Int. Cl.
*G06K 7/015* (2006.01)
*B41J 1/00* (2006.01)

(52) U.S. Cl. ......................... 382/306; 382/317; 358/1.1

(58) Field of Classification Search .................. 382/306
See application file for complete search history.

(56) References Cited

U.S. PATENT DOCUMENTS 5,568,573 A * 10/1996 Wada et al. ................. 382/317
2001/0017700 A1* 8/2001 Homma ..................... 358/1.1

* cited by examiner

*Primary Examiner*—Matthew C. Bella
*Assistant Examiner*—John W Lee
(74) *Attorney, Agent, or Firm*—Richard J. Gregson; Robert P. Marley; Brooks Kushman PC

(57) ABSTRACT

A document processing system includes a feeder stage and a transport stage. The document track assembly includes at least one feedback section forming a document return path that extends from an exit point at one part of the document track to a reentry point at another part of the document track further back, upstream. The document track assembly is configured to allow the selective rerouting of a document through the document return path to make a repeat pass through a processing station located between the document track reentry point and the document track exit point. This provides increased reliability in document processing, particularly when processing involves checks, obtaining electronic images of checks, and check truncation.

9 Claims, 2 Drawing Sheets

DOCUMENT PROCESSING SYSTEM WITH TRACK ALLOWING SELECTIVE REPROCESSING OF DOCUMENTS

BACKGROUND OF THE INVENTION

1. Field of the Invention

The invention relates to document processing systems. The invention further relates to increasing the reliability of document processing, particularly when processing involves checks, obtaining electronic images of checks, and check truncation.

2. Background Art

An existing document processing system for feeding and transporting documents includes a feeder that separates and feeds documents singly, in order, from a document stack. The remainder of the system is the transporting portion of the system, and includes a number of roller pairs and/or belts that convey the documents, one at a time, through a track past other processing devices that perform operations on the documents.

The processing devices include a Magnetic Ink Character Recognition (MICR) reader for reading any MICR digits that appear on the document, and include imaging devices for capturing images of the document. Additional processing devices may also be included in the system, depending on the application. For example, one or more optical edge detectors may be employed for determining the length of a passing document. Finally, a multi-pocket stacker module is provided for the actual sorting of documents into pockets.

FIG. 1 illustrates an existing document processing system for feeding and transporting documents at 10. System 10 includes a primary feeder 12 and a secondary feeder 14. Cabinet 16 houses a computer running software for system 10. System 10 further includes removal knee well panel 18. The feeders act to separate and feed documents singly, in order, from a stack. The remainder of the system is the transporting portion of the system.

As shown in FIG. 1, a number of processing devices are located in the transporting portion of the system 10. Magnetic Ink Character Recognition (MICR) reader 20 and Optical Character Recognition (OCR) reader 22 are located in the document track following secondary feeder 14. As well, upstream imaging devices 24 and 26 image each passing document. The operator display is indicated at 28.

With continuing reference to FIG. 1, system 10 further includes a post-read view station 30, and a low-speed document encoder 32. As well, a Multi-Jet Endorser (MJE) is located at 34. Further down the document track, an amount-only or full-field, high-speed encoder 36 and downstream imager 38 process the passing documents. Finally, a twelve-pocket stacker module 40 is provided for the actual sorting of the documents into pockets.

Traditionally, document processing is a one-pass operation where each document makes a single pass through the document track, and the operation is either successful or not successful. If a document is not processed successfully, the document is either sent to a reject pocket in the stacker module or the machine is stopped to allow the operator to physically find the problem document, which typically could be located several feet away, and then correct the problem. In certain applications, it is necessary to maintain the exact order of the documents in the track.

Although existing document processing systems have been successful, the disruptions in the normal document flow and the operation time lost due to document processing problems affect overall system performance in a way that is not significant. Accordingly, there is a need for an improved document processing system having increased reliability.

SUMMARY OF THE INVENTION

It is an object of the invention to provide an improved document processing system including a track design which allows documents to be selectively redirected for reprocessing without reversing the direction of document travel or interrupting the flow of preceding or following documents.

In one aspect of the invention, the reliability of document processing is increased. In a comprehended approach to document processing according to the invention, a document may be automatically reprocessed without disrupting the normal document flow in the machine. Operators may be alerted to document processing problems in a manner which allows immediate error correction.

In carrying out the invention, a document processing system is provided. The system comprises a feeder stage and a transport stage. In the feeder stage, a feeder separates and feeds documents singly, in order, from a document stack. The transport stage conveys the documents, one at a time, through the document track past a number of processing devices that perform operations on the documents. At the end of the transport section, the documents may be sorted into pockets of a multi-pocket stacker module. In the alternative, documents could simply be collected in a single stack, destroyed, or some other approach may be taken for handling processed documents, depending on the application.

In accordance with the invention, the document track of the document processing system includes at least one feedback section. A feedback section of the track forms a document return path that extends from one part of the document track to another part of the document track that is further back, upstream. In this way, a document that is routed through the document return path provided by the feedback track section may make a repeat pass through a processing station located between the return path reentry point and the exit from the main document track to the return path. Advantageously, the repeat pass may be completed without reversing the direction of document travel. It is also possible to conduct the repeat pass without interrupting the flow of preceding or following documents by controlling the feeder stage and transport stage appropriately.

In a preferred embodiment of the invention, the path followed by the document track is an S-shaped curve that allows sufficient track length for the desired document processing operations while maintaining an ergonomic package size for operator access. The S-shape provides two additional turns in the track compared to a standard straight-track configuration. This creates two potential document return paths.

At each turn of the two additional turns in the S-shaped track, a feedback section of the track comprises a gate to direct documents to the normal path or the return path. These gates may be similar to the gates that are typically used in documents stackers.

As a particular document is being processed, sensor information and data about the document being processed are used to determine if the document processing is proceeding as expected. In the case where a document is not being processed as expected, one or both track gates could be actuated to redirect the document past one or more processing stations for a repeat pass. This could be done such that no operator intervention is required.

In the event that the document is not processed as expected multiple times, or if desired for the particular application, the document could be redirected to reappear before the operator.

A screen message could explain why the document had been returned for operator action. Under some circumstances, it could be possible for the operator to correct the problem document without touching it. The problem document could also be removed from a station immediately in front of the operator, if desired.

The advantages associated with embodiments of the invention are numerous. For example, a document could be processed multiple times without operator intervention. This effectively creates redundancy, potentially reducing problems caused by random errors. Further, for example, a document could be returned to a station directly in front of the operator, both identifying the problem document and presenting it to the operator at the operator's workstation. Still further, it is appreciated that document repeat pass capability advantageously provides time for non-real time secondary data processing to determine exception resolution without stopping the document.

DETAILED DESCRIPTION OF THE PREFERRED EMBODIMENT

Figure 1:
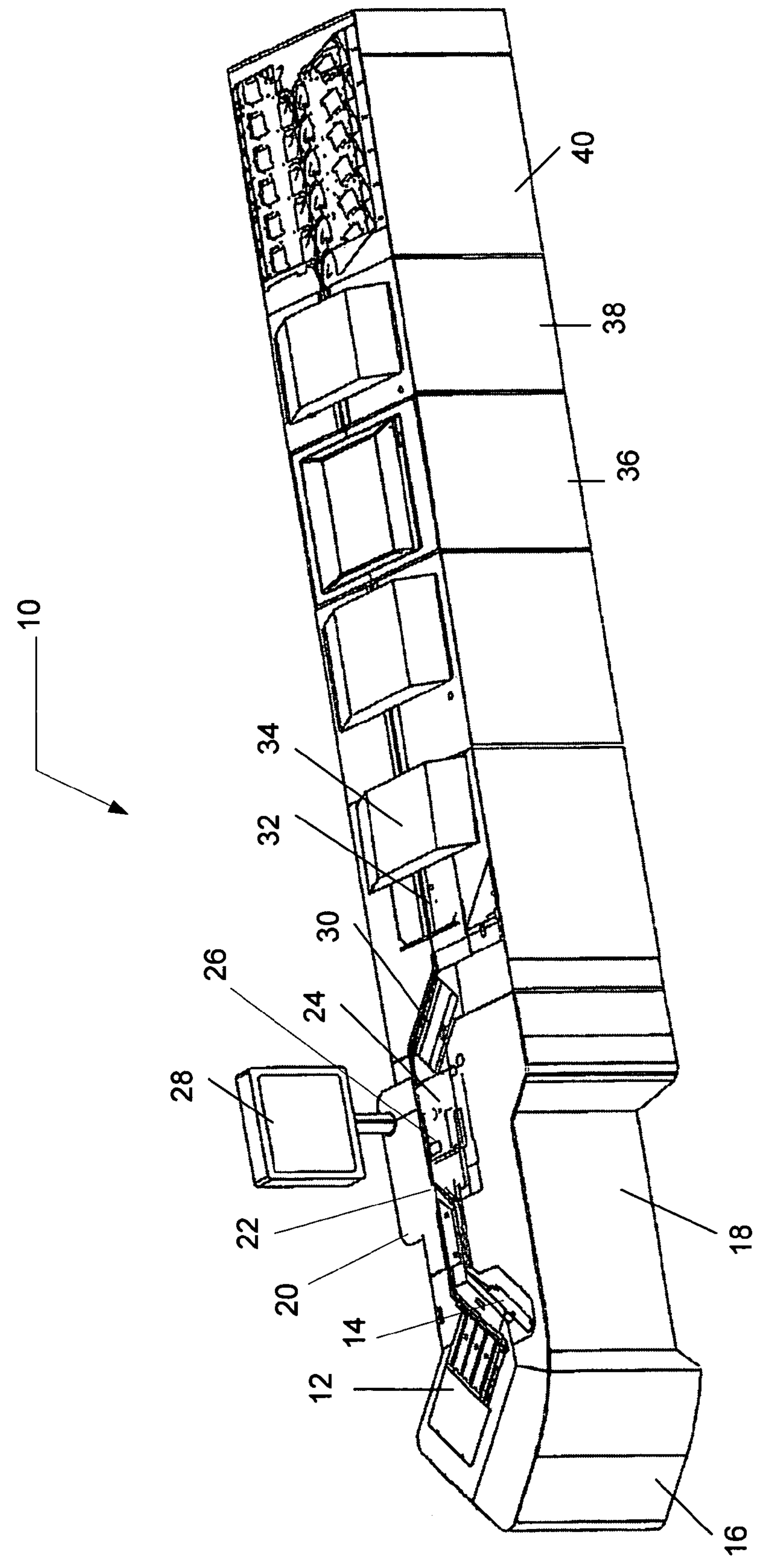
FIGURE 1 (PRIOR ART)
FIG. 1 illustrates an existing document processing system.
Figure 2:
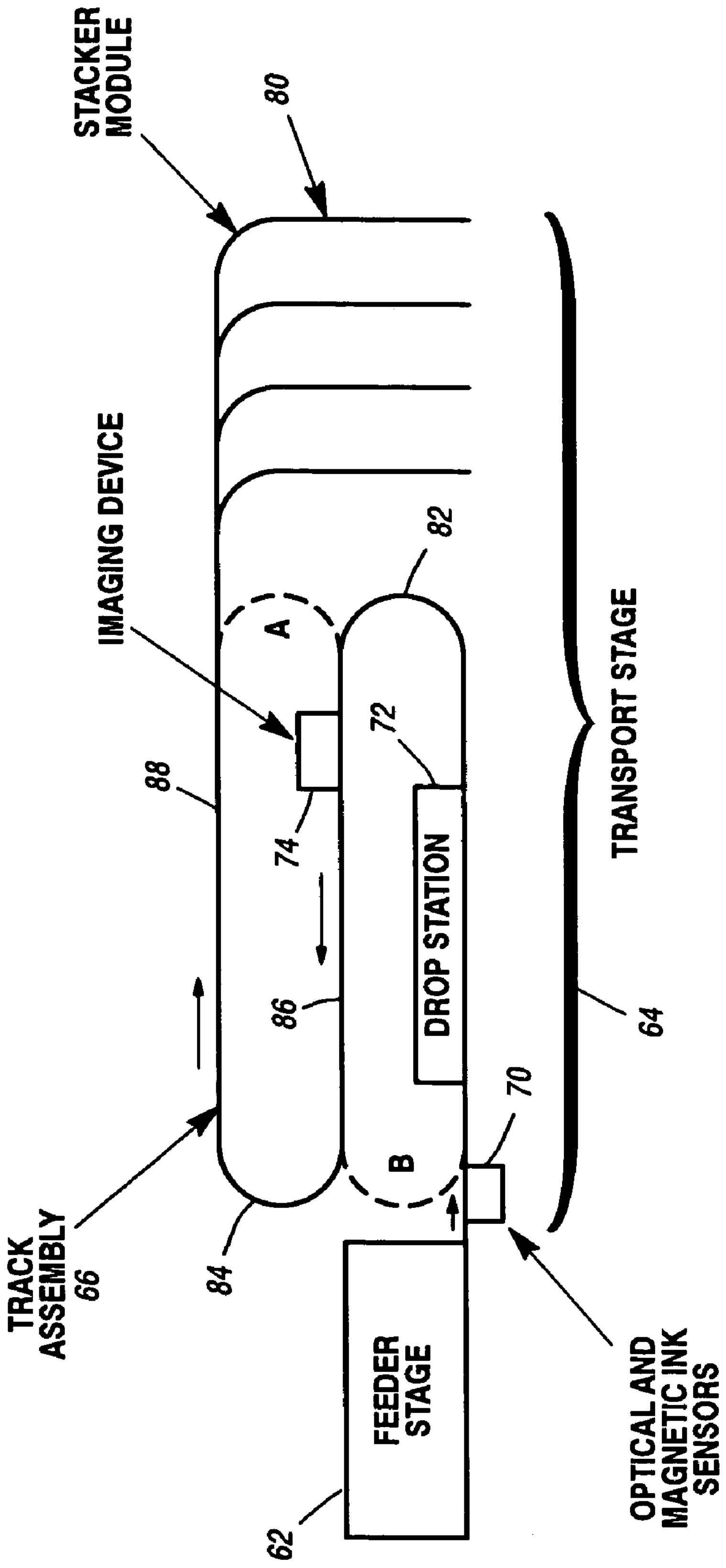
FIG. 2 illustrates a document processing system made in accordance with the invention, showing the use of document return paths to allow selective document rerouting.

FIG. 2 illustrates a document processing system in a preferred embodiment of the invention. A feeder stage 62 feeds documents from a document stack. A transport stage 64 conveys the fed documents through the document track and past the plurality of processing devices that perform operations on the documents. As shown, the track assembly is indicated at 66.

Transport stage 64 further includes optical edge detectors and magnetic ink sensors 70, drop station 72, and imaging device 74. Stacker module 80 is provided for the actual sorting of documents into pockets. In this preferred embodiment, the document path is an S-shape which allows sufficient track length for the desired document processing operations while maintaining an ergonomic package size for operator access. The two turns of the S-shape create two potential document return paths.

Document track assembly 66 includes feedback section A forming a first document return path and feedback section B forming a second document return path. Each document path extends from an exit point at one part of the document track 66 to a reentry point at another part of the document track 66 further back, upstream. A suitable implementation for a feedback section is a gate that directs documents to the normal path or the return path. These gates could be similar to existing gates used in document stackers.

According to the invention, sensor information and/or data about the document being processed are used to determine if the document processing is proceeding as expected. If a document is not being processed as expected, one or both track gates could be actuated to redirect the document past a processing station again. No operator intervention would be required in this approach. Further, if the document is not processed as expected multiple times, or if desired by the application, the document could be redirected to reappear before the operator and a screen message could explain why the document had been returned for operator action. In some circumstances, it would be possible for the operator to correct the problem document without touching it.

In accordance with the preferred embodiment, information is gathered from different sensors including optical sensors which look across the track and sense the presence of a document and provide a measurement of its length, magnetic ink sensors that read information from the document, and imaging cameras that create an electronic image of the document. By comparing length data from the optical sensors with document length data derived from the electronic image data package size, the system determines if the imaging operation was successful. This decision can be made quickly enough to redirect documents while they are still being transported. In this way, documents could be redirected such that they would pass through the imager again, as needed. In the event that the mismatch between optical and image length data persists, the document could be further redirected to appear before the operator for disposition.

In operation, a document is fed from feeder stage 62. The document proceeds past drop station 72, first track turnaround 82, imaging device 74, along the track and past second track turnaround 84, and along the track to stacker module 80. In the illustrated embodiment, in the event that an error is detected in processing the document, three different ways of redirecting the document are possible. The document could be diverted after track portion 86 through turnaround B to either stop in front of the operator at drop station 72 or to again travel through turnaround 82 for reprocessing. The document could be diverted after traversing track portion 88 through turnaround A to pass through imaging device 74 and then proceed through the remainder of the track to stacker module 80 if reimaging was successful. Further, the document could be diverted after traversing track portion 88 through turnaround A to pass along track portion 86 and then through turnaround B to stop in front of the operator at drop station 72 for disposition.

Among many advantages comprehended by the invention is that the document can be reprocessed without reversing track direction. This has advantages both in simplifying the drive mechanism, and in not requiring the track to be designed to handle documents smoothly in both directions. An advantage of the preferred embodiment is that the S-shape of the track provides increased track length within the normal reach of a stationary operator. Another advantage is that documents could be selectively redirected through the diversion turnarounds using existing devices used to select pockets in stacking devices. These devices work fast enough and reliably enough to be used with minimal modification.

The increased reliability provided by embodiments of the invention may be advantageous in applications involving check truncation. In check truncation, a paper check is processed by a document processing system and the paper check is converted to an electronic form. This electronic information may later be used to create a substitute check in a process called check reconverting or to create an image replacement document. It is appreciated that check truncation will eventually be a process in widespread use, and embodiments of the invention provide improved document processing with increased reliability that will be very useful in these applications.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A document processing system comprising:

a feeder stage for feeding documents from a document stack;

a transport stage, including a document track assembly and a plurality of processing devices, for conveying the fed documents through the document track and past the plurality of processing devices, the processing devices performing operations on the documents;

the document track assembly including at least one feedback section forming a document return path that extends from an exit point at one part of the document track to a reentry point at another part of the document track further back, upstream;

wherein the document track assembly is configured to allow the selective rerouting of a document through the document return path to make a repeat pass through a processing station located between the document track reentry point and the document track exit point;

the processing station providing information and data pertaining to a document being processed to determine if the document being processed is proceeding as expected; and wherein upon the information and data indicating a processing error for the document, the document track assembly reroutes the document through the document return path to cause the document to undergo reprocessing at the processing station rep eating the processing at the processing station.

2. The document processing system of claim 1 wherein reprocessing a document by selectively rerouting the document through the document return path occurs without reversing the direction of document travel.

3. The document processing system of claim 1 wherein reprocessing a document by selectively rerouting the document through the document return path occurs without interrupting the flow of preceding or following documents.

4. The document processing system of claim 1 wherein the document track includes a portion in the form of an S-shaped curve forming two turns.

5. The document processing system of claim 4 wherein the document track assembly includes, at one of the turns, a feedback section forming a document return path.

6. The document processing system of claim 4 wherein the document track assembly includes, at each of the turns, a feedback section forming a document return path.

7. The document processing system of claim 1 wherein the at least one feedback section comprises:

a gate for selectively directing documents to the document return path.

8. The document processing system of claim 1 further comprising:

wherein when the reprocessing of the document still results in a processing error, the document track assembly redirects the document to cause that document to reappear before the operator for disposition.

9. The document processing system of claim 1 further comprising:

at least one edge detector for determining the length of the document being processed;

an imaging device for imaging the document being processed, and for determining the length of the document being processed; and wherein the document track assembly reroutes the document through the document return path when the document length from the at least one edge detector and the document length from the imaging device disagree.

* * * * *